Patented Aug. 18, 1936

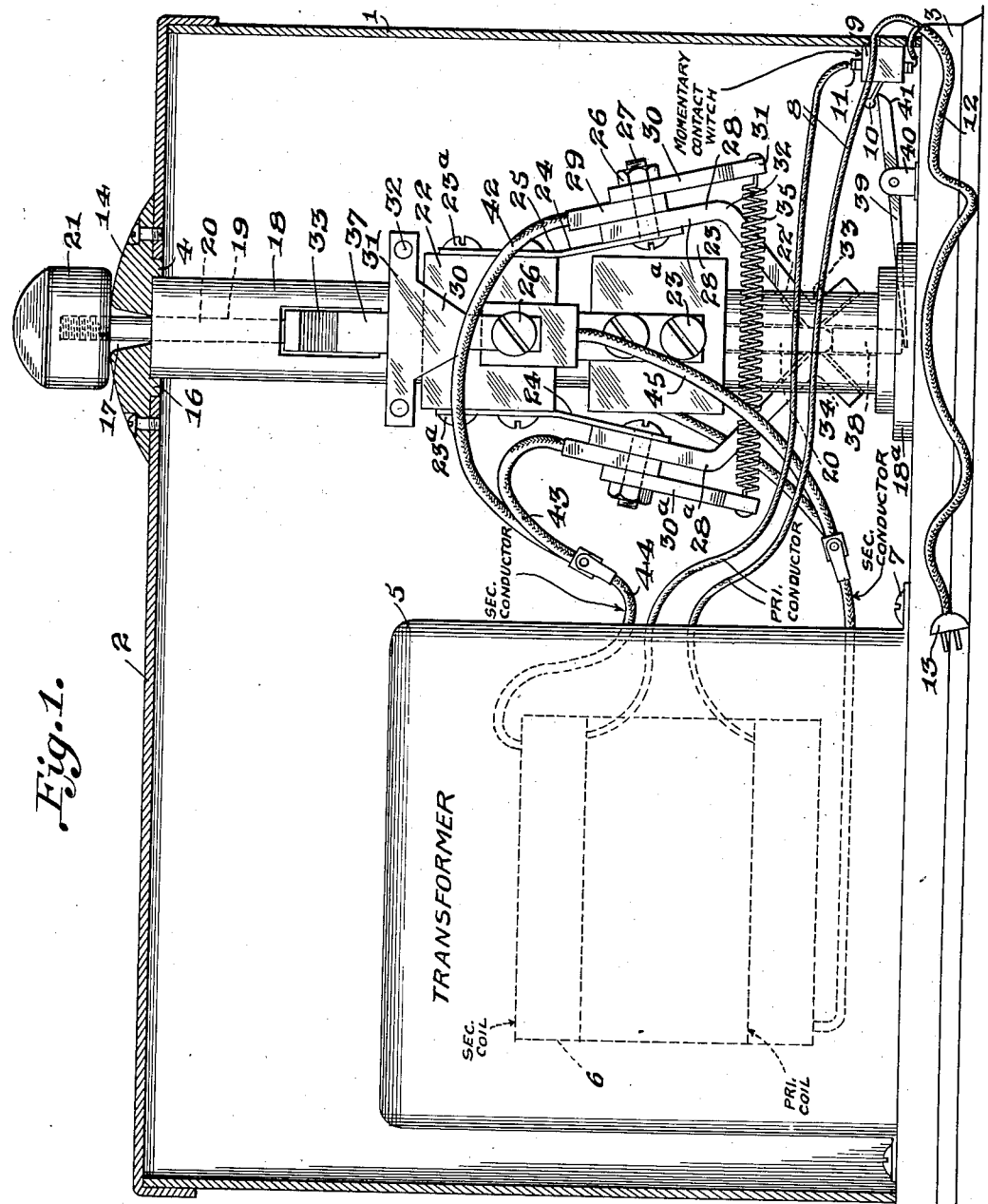

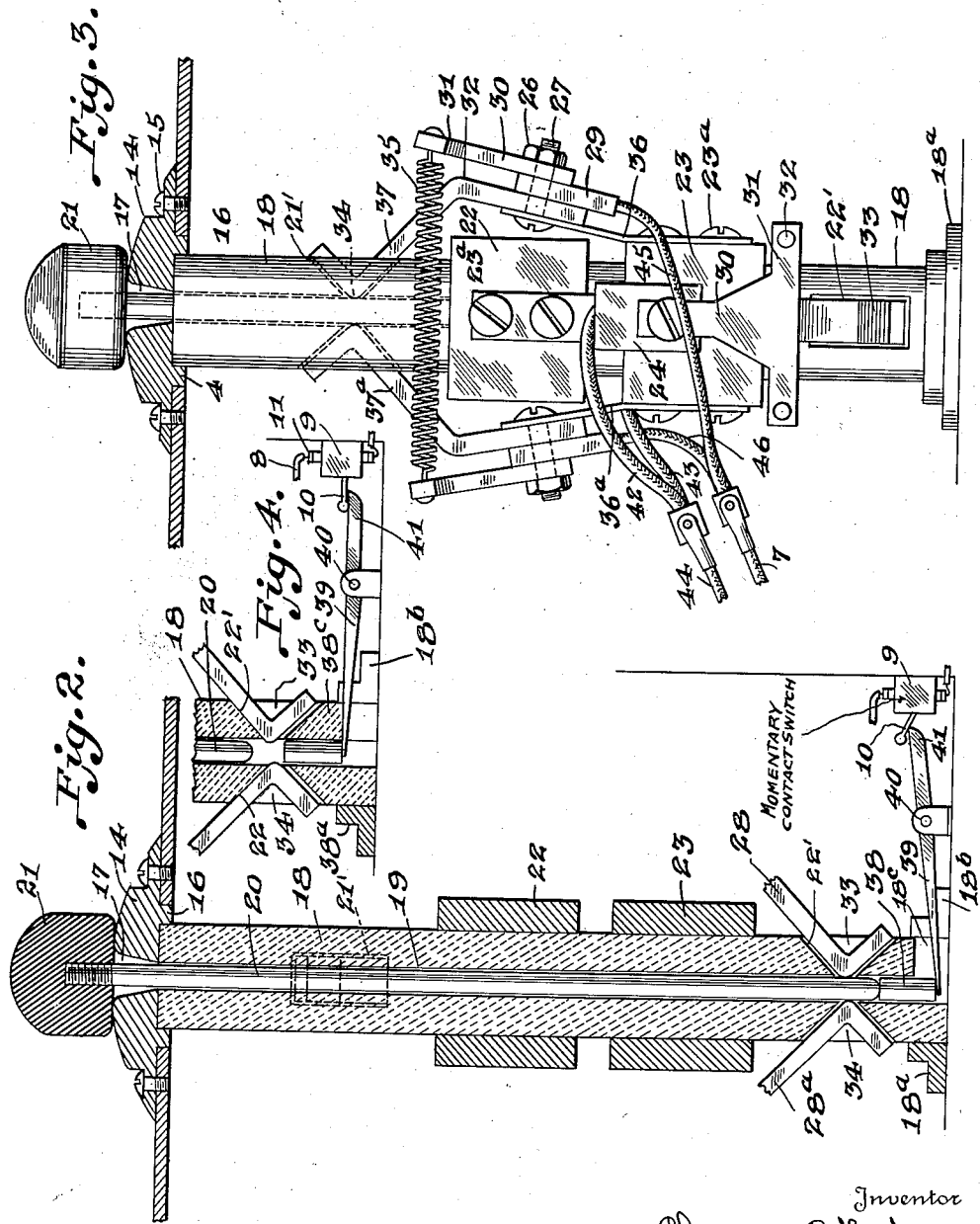

2,051,759

UNITED STATES PATENT OFFICE 2,051,759

ELECTRIC HEATER

Clarence E. Turpin and Raymond Jetter, Omaha, Nebr.

Application July 27, 1934, Serial No. 737,293

7 Claims. (Cl. 219—23)

This invention relates to certain improvements in electric heaters for heating a removable element therein; and the nature and objects of the invention will be readily recognized and understood by those skilled in the arts to which it relates in the light of the following explanation and detailed description of the accompanying drawings illustrating what we at present believe to be the preferred embodiments and mechanical expressions of our invention from among various other forms, arrangements, combinations and constructions, of which the invention is capable within the spirit and scope thereof.

Primarily, the invention relates to an apparatus for electrically heating a metallic element of a material having high electrical resistance and being a poor conductor of heat, the heated element with these qualities when heated to a high degree being used for immersion in beverages or for branding, marking and the like. While the invention has been particularly designed for such purposes, it is apparent and to be understood that it may be utilized for purposes other than these set forth, so that a variety of uses and purposes are contemplated and come within the scope of our invention.

It is an object of the invention to provide a compact and entirely enclosed element heating apparatus, wherein the various parts thereof may be quickly removed therefrom and are easily accessible for repair.

It is a further object of this invention to provide an apparatus for heating an element whereby the element may be disconnected and entirely removed therefrom for use while heated.

Another characteristic of the invention is the provision of a heating apparatus wherein there is a minimum loss of heat while the element is being subjected to the heating operation.

A further and important feature of the invention is the provision of means wherein the electrical circuit is closed by the insertion of the heating element within the apparatus.

A further feature of this invention is to provide a removable element to be heated which when removed from the heating apparatus for use is entirely free from electrical connections or wires.

The invention includes as another feature thereof the provision of an electric heating apparatus wherein the electric circuit is automatically closed and opened upon inseration of the element to be heated therein and removal therefrom.

Another object of the invention is in its design and construction whereby the various electrical contacts are self-cleaning and will require little or no attention.

Another object of this invention is the rapid heating by the apparatus disclosed and the slow dissipation of heat thereafter.

It is a further object of the invention to provide an electric heating apparatus wherein an element is heated by dissipation of electrical energy within the element itself.

Another object of the invention is an electric heating apparatus of this type which is economical in electric consumption while capable of heating to a high degree.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 of the drawings is a view in elevation of the apparatus within the casing.

Fig. 2 of the drawings is a vertical section through the heating and contact apparatus in the position shown in Fig. 1 with parts broken away and removed.

Fig. 3 is a view in elevation of the heating apparatus as shown in Fig. 1, the apparatus being turned 90° from its position in Fig. 1.

Fig. 4 is a vertical section on the line 4—4, of Fig. 2, with the element to be heated removed.

Referring to the drawings, a casing 1 for housing the entire heating apparatus is provided, having a removable top or cover 2 positioned thereon and a base 3 for supporting the heating apparatus therein.

A transformer 5 is provided and is secured within the casing 1 to the base 3 thereof by means of screws or the like 7, the transformer 5 having the usual cores 6 and the windings thereon which are not shown. Primary conduction wires 8 are provided to the transformer coils and are connected in the circuit and to a momentary contact switch 9 which is secured to the side wall of the casing 1 in any suitable manner.

The momentary contact switch 9 is provided with a lever or switch arm 10 which is shown in Fig. 1 of the drawings in its upwardly or closed circuit position, while in Fig. 4 of the drawings it is shown in its downwardly or depressed position for opening the circuit.

The arm 10 is operated by a spring within switch 9 which acts to hold the switch in open circuit position with the switch arm 10 in depressed position as diclosed in Fig. 4 of the drawings, the spring within the switch not being shown.

Usual binding posts or terminals 11 are provided on switch 9, to one of which is connected a cable 12 having a plug 13 on one end thereof for connection with a power source, the free line of cable 12 forming a part of the primary conductor and passing into the transformer 5. The other post 11 has connected thereto a line leading from the transformer to complete the circuit when the switch 9 is operated to close the circuit.

Adjacent one end of the removable top 2 of the casing 1, a hole or opening 4 is provided for receiving therein a plug member 14 having a diameter greater than the hole 4. The plug 14 is secured over the hole and serves as a cover or top therefor, and is secured to the top 2 by means of screws or the like 15, which pass through the plug and are screwed into the top 2. On the under side of the plug 14 an annular rib 16 is provided having a diameter equal to that of the hole 4 so that the outer edges of the rib 16 will lie adjacent and closely fit against the edges of the hole. The upper or top side of the plug 14 is convex and is provided with a central aperture 17 therethrough, which is upwardly flared so that the diameter of the aperture upwardly increases.

A longitudinally elongated heat resistance tube 18 of a length equal to the depth of the casing 1 and a diameter equal to the diameter of the space formed on the under side of block 14 by the rib 16, is vertically positioned within the casing so that the lower end thereof rests and is supported on the casing base 3, and the upper end of the tube 18 fits closely in and is received within the annular rib 16.

We prefer that the heat resistance tube be made of a refractory material in order to reduce the heat loss to a minimum.

The central aperture or channel 19 of the tube 18, when the tube is in its operative position within the casing and when plug 14 is in position covering the opening 4 in top 2, is concentric with respect to the aperture 17, thereby forming a continuous channel which extends from the top of plug 14 through the plug and to the bottom of the tube 18.

Tube 18 is securely fitted to the base 3 by means of a collar 18a which is secured to the base by any suitable and desirable means. The collar 18a is cut away on one side thereof as at 18b to form an opening therethrough. Adjacent the opening 18b through the collar, the tube 18 is cut away as at 18c, whereby an opening is formed through the collar and tube to the channel 19 on one side thereof.

A metal rod 20 having a handle or knob 21 secured on one end thereof and insulated therefrom and of a material to withstand intense heat, is adapted to be inserted into channel 19 for closing an electric circuit to heat the rod, as will be hereinafter explained. It is advantageous that the rod to be heated by insertion in the apparatus be formed of metal having a high electrical resistance and be a poor conductor of heat. The length of the rod 20 is such that when inserted in tube 18 it does not extend to the bottom thereof, whereby a space in channel 19 at the lower end of tube 18 remains unfilled and free of the rod. The diameter of rod 20 is slightly less than that of the channel 19 so that a sliding fit is had.

The tube 18 has formed therein at a point spaced below the top a pair of slots 21' which extend into the channel 19 of the tube 18 from opposite sides of the tube. The slots are of V-shape positioned longitudinally of the tube so that the apexes 34 are at the inner side thereof adjacent to and opening into the channel 19 whereby a horizontal opening is formed through the tube extending from one side thereof to the other.

A similar pair of slots 22' are formed in tube 18 adjacent the lower end thereof at a point on the tube 90° from the upper slots 21'. It is readily understood and apparent from the drawings and description of the slots that two horizontal openings at right angles to each other extend through the tube, one adjacent the top and the other adjacent the lower end of tube 18, for a purpose to be described hereinafter.

Vertically spaced collars 22 and 23 (of Fig. 1 of the drawings) are secured by suitable means to tube 18 at points therealong between the two pairs of slots 21' and 22'. Secured on the upper collar 22 on opposite sides thereof in the same vertical plane as the lower slots 22' are downwardly depending flexible metallic spring members 24. Screws 23a are utilized for securing the members 24 to the collar 22. The members 24 are slightly bent at a point 25 adjacent the lower edge of the collar, to extend laterally outwardly away from the tube 18.

Each of the flexible spring members 24 carries and has secured thereon an organization of parts which are identical, and for clarity, I shall only describe one set or organization, but it will be understood that both members 24 on opposite sides of collar 22 carry the elements which are about to be described.

The member 24 adjacent its lower end is drilled to receive a bolt 27 which projects therefrom, and a nut 26 is provided to be screwed on the bolt 27. A contact arm 28 is adapted to be carried on the bolt 27 of member 24 and to extend downwardly therefrom. The outer end of bolt 27 carries an arm 30 which also extends downwardly, the lower part of which forms a bridge portion 31 having a hole 32 at each end thereof for a purpose to be pointed out hereinafter. Interposed on bolt 27 between contact arm 28 and arm 30 is an electric cable terminal 29. Upon tightening the nut 26 it is apparent that the three elements carried by bolt 27 will be forced together and firmly carried by spring member 24.

We desire to point out that contact arm 28 is insulated from spring member 24 and that the cable terminal 29 is insulated from the arm 30.

The contact arm 28 is laterally bent inwardly toward tube 18 at a point 32 inclining therefrom downwardly toward the tube and the lower slots 22'. The lower end or portion of the contact arm is V-shaped as at 33 to conform to the shape of the slots 22' in tube 18 into which the V portion 33 extends with the apex 34 of the V of the contact arm pointing inwardly toward and extending into the channel 19 of tube 18.

Coiled springs 35 are stretched from each end of the bridge 31 to the corresponding end of the bridge 31a which is mounted on and carried by the spring member 24 on the opposite side of tube 18. The ends of springs 35 are hooked into the holes 32 which are provided for that purpose on each end of the opposed bridges.

It is now apparent that by the action of the springs 35 the entire organization of elements carried by each flexible member 24 on the opposite sides of tube 18 will be constantly forced toward each other and consequently the V-shaped portion of the lower contact arms 28 and 28a will be forced into the slots and the apex of the V portion will extend into the channel 19.

Referring particularly to Fig. 3 of the drawings which discloses the contact apparatus in a position turned 90° from the position disclosed in Fig. 1 of the drawings, Fig. 3 shows particularly and in detail the construction, organization and arrangement of the upper contact arms, their mounting and design which is similar to the lower contact arms in structure.

The lower collar 23 has secured thereon upwardly extending spring members 36 and 36a on opposite sides of the collar 23. These are identical to the spring members 24 which are secured on the upper collar 22 and have been described. The arrangement and mounting of the terminals 29, upper contact arms 37 and 37a and arm 30 and bridge 31, are precisely similar in this upper contacting structure of Fig. 3 to that disclosed in Fig. 1 of the drawings and hereinbefore described, with the exception that the contact arms and arm 30 extend upwardly from the lower collar 23 toward the upper slots 21'. The upper contact arms 37 and 37a are constructed to incline toward the tube 18 and the end portions thereof are V-shaped and adapted to extend and fit into the slots 21' so that their apexes 34 point towards the channel 19, and extend thereinto. The upper contact bridges 31 are connected together by means of springs 35 similar to those employed between the lower bridges 31 and 31a.

It is readily understood that there are two sets of contact arms, the lower 28 and 28a extending into the lower slots 22' and the upper contact arms 37 and 37a extending into the upper slots 21'. Furthermore, it is apparent that the lower collar 23 carries the organization supporting the upper contact arms and the upper collar 22 carries the organization supporting the lower contact arms and both are of identical form and construction.

Furthermore, it is apparent and made clear by the drawings that the upper contact arms which are carried by the lower collar extend upwardly and into the upper slots in the heat resistance tube, while the lower contact arms which are carried by the upper collar depend downwardly therefrom and into the lower slots in the heat resistance tube and it is also to be understood that each set of contact arms are mounted on the collars at points 90° around the heat resistance tube and the slots are formed at corresponding positions above and below the collars, the upper slots being in the same vertical plane as the upper contact arms which are carried by the lower collar, and the lower slots being in the same vertical plane as the lower contact arms which are carried by the upper collar.

As was pointed out earlier in the description of our invention the rod 20 does not extend to the bottom of the channel 19 thereby a space remains in the channel below the slots 22 which is free of and not penetrated by the rod 20. In this space is loosely positioned a vertically slidable plug 38 which rests on a lever 39 which is mounted for rocking movement on a bracket 40 secured to the base 3 of the casing 1 adjacent the openings 18b and 18c in collar 18a, the outer end 41 of the rocking lever 39 being positioned to contact arm 10 of the switch 9.

The lower contact arms 28 and 28a are connected to the transformer 5 and into the electric circuit by means of cables 42 and 43, one of which leads to each contact arm through the terminal 29 which is mounted on and carried by spring member 24. The cables 42 and 43 lead into the transformer through the secondary conductor 44.

The upper contact arms 37 and 37a are hooked into the circuit in a similar manner by means of the cables 45 and 46 and the cable terminals 29 of the upper contact organization and then to the transformer through the secondary conductor.

When it is desired to heat the rod 20 to a desired degree for use for the purpose set forth, the plug 13 being inserted in a socket to hook the apparatus into the power line, the rod 20 is inserted through the aperture 17 of the plug 14 and into the channel 19 of the tube 18. The insertion of the rod 20 into the heating apparatus is facilitated by the upwardly flaring form of the aperture 17. When the rod 20 has been inserted the full distance into the channel 19, the lower end of the rod will come into contact with the plug 38 which is vertically slidably positioned in the space in the channel below the lower end of the rod. The plug 38 will be forced downwardly by the rod 20 against the end of the rocking lever 39 which extends beneath the plug 38 and the rod 39 will be rocked so that its outer end 41 will force the arm 10 of the contact switch upwardly against the action of the spring within the switch, thereby closing the circuit, from the power source into the apparatus.

Through the action of rod 20 on the various members as described, to close the circuit, it is seen that the operation of the switch 9 is entirely automatic and the heating of rod 20 is started instantaneously merely by its full insertion within the heat resistance tube, no attention being required to open or close the switch.

Opening the circuit is also automatic upon removal of rod 20 from the tube. When the rod is removed the plug 38 is free to slide vertically in channel 19 so that the outer end 41 of rocking lever 39 will be depressed by switch arm 10, consequently opening the circuit to stop the rod heating operation.

Fig. 4 discloses a pair of contact arms when the rod 20 is removed from the apparatus. This figure also shows the position of the rocker arm 39 and the switch arm 10 and the block 38 when the rod is removed. It is seen that the contact points of the V-shaped portions of the contact arms will be self-cleaning due to the fact that when the rod 20 is inserted and withdrawn these contacts are dead and no arc occurs.

When rod 20 is not in its position within tube 18 the apexes 34 of the V-shaped portions 33 of the contact arms will extend into the channel 19 through the tube. This occurs due to the action of the coiled springs 35 which draw the spring members 24 inwardly toward tube 18 and the contact arms being carried thereby will in like manner be drawn inwardly toward the tube. Therefore upon insertion of rod 20 into circuit closing and heating position within the tube 18 it will come into close contact with both the upper and lower contact arm apexes 34 forcing them out of channel 19 against the action of springs 35 which at all times while rod 20 is in heating position will draw the contact arms inwardly and keep the apexes 34 thereof in close contact with the rod. Thus when rod 20 is inserted into tube 18 and the switch 9 is closed, the rod 20 to be heated will be in electrical contact with each contact arm of the upper and lower pairs of arms so that an electrical circuit will be made through the apparatus.

With the circuit through the heating apparatus closed, the current will flow through the primary conductor 8 to the transformer 5 and from the transformer through the cables 46 to the upper contact arms and to the rod 20 through the apexes 34 of the V-shaped portions of the upper contact arms which are in close electrical contact with the rod 20 where it is adjacent the slots 21'. The current then flows downwardly through the rod 20 to the V-shaped portions of the lower contact arms and through the contact arms to the cables 42 and 43 and back to the transformer and the cable 12 to complete the circuit.

The length of time rod 20 is left in its heating position within the apparatus is dependent upon the degree of heat required which in turn is dependent upon the use to which the heated rod is to be put.

The rod is quickly heated and the heating is facilitated by utilizing a heat resistance tube which is of refractory material which reduces the heat losses to a minimum. Furthermore, the tube 18 which rests on base 3 is entirely closed and insulated when rod 20 is in position for heating within the tube as the aperture 17 in plug 14 is closed by the handle or knob 21. It is also of great advantage to use a rod to be heated which is made of a metal having a high electrical resistance and is a poor conductor of heat, as the high resistance is necessary for the dissipation of electrical energy and the faculty to hold heat when the device is used for immersing in beverages and the like, as the heat is not so readily transmitted to the beverage or the material being heated.

It is possible and contemplated by our invention to employ a battery of heating units of the type disclosed whereby a plurality of metallic rods may be heated and in use at the same time, and it is also to be understood that any number of rods may be used with one apparatus.

What we claim is:

1. An element heating apparatus including a tube having openings therethrough spaced apart longitudinally of the tube, contact arms extending into said openings, an electric circuit including said contact arms, a switch operated to control said circuit, an element to be heated removably inserted in said tube in engagement with each of said contact arms to complete said electric circuit, and means for closing said switch upon insertion of said element in the tube, including a slidable plug within said tube, a rocker arm mounted adjacent said tube and having one end thereof extending beneath said plug in normal position raised above the bottom of said tube and the other end thereof coacting with a spring operated switch control arm, whereby said plug is depressed by said element and said switch arm is operated to close said switch whereby the electric circuit is closed.

2. An element heating apparatus, including a tube having transverse openings therethrough spaced apart longitudinally of the tube and at right angles to each other, and pairs of opposed flexible members carried by the tube intermediate the openings therethrough and spaced apart longitudinally of the tube, pairs of opposed contact arms carried by said flexible members and adapted to extend therefrom into the tube through the openings therethrough, each pair of opposed contact arms extending substantially longitudinally of the tube in the opposite direction from the other pair toward a transverse tube opening, and means operatively connecting the opposing flexible members and the contact arms of each pair together to draw said arms under tension toward each other and to a relatively close position in the tube, and an electric circuit including said contact arms, an element to be heated adapted for removable insertion in said tube in position therein engaging and separating said opposed contact arms of each pair, whereby said electric circuit is completed through said element, for heating thereof.

3. An element heating apparatus, including a tube having transverse openings therethrough spaced apart longitudinally of the tube and at right angles to each other, and pairs of opposed flexible members carried by the tube intermediate the openings therethrough and spaced apart longitudinally of the tube, pairs of opposed contact arms carried by said flexible members and adapted to extend therefrom into the tube through the openings provided therethrough, each pair of opposed contact arms extending longitudinally of the tube in an opposite direction from the other pair toward an opening in the tube and resilient means operatively connecting the opposing flexible members and the contact arms of each pair together to draw said arms toward each other and into the tube, and an electric circuit including said contact arms, an element to be heated adapted for removable insertion in said tube in engagement with said contact arms, whereby said electric circuit is completed through said element, for heating thereof.

4. In an element heating apparatus, a heat resistance tube forming a substantially closed and heat retaining tubular chamber when the heating operation is in progress, and the tube having one end open when the apparatus is in non-heating condition, and a movable member disposed in said tube adjacent one end thereof and forming a closure for that end of the tube, said tube having transverse openings therethrough spaced apart longitudinally of the tube, contact arms carried by the tube and adapted to extend into the tube through the transverse openings provided therein, and to substantially close said openings, an electric circuit including said contact arms and including a circuit controlling switch, said switch being operably coupled with said movable member, and an element to be heated provided for removable insertion in said tube through the open end thereof, said element in tube inserted position engaged by said contact arms, and means for closing the open end of the tube when the element is in position inserted in the tube for heating, and said element to be heated when in tube inserted heating position adapted to engage and actuate said movable member to operate the switch thereby closing the circuit through the contact arms and the element for the heating operation.

5. An element heating apparatus, including a heat resistance tube, a movable member disposed in said tube adjacent one end thereof, and said tube having transverse openings therethrough spaced apart longitudinally of the tube between said movable member and the opposite end of the tube, contact arms carried by the tube and adapted to extend into the tube through the transverse openings therethrough, an electric circuit including said contact arms and a switch, said switch operably coupled with said movable member and operable to control said electric circuit, and an element to be heated adapted for removable insertion in said tube through the end thereof removed from the movable member, said element to be heated when in tube inserted position being engaged by said contact arms, and adapted to engage and actuate said movable member whereby the switch is operated to close the electric circuit through the contact arms and said element, for heating thereof.

6. An element heating apparatus, including a heat resistance tube, a movable member disposed in said tube adjacent one end thereof, an element to be heated adapted for removable insertion in said tube through the end thereof removed from said movable member, and said tube having transverse openings therethrough spaced apart longitudinally of the tube between said movable member and the opposite end of the tube, the opening in the tube nearest said movable member being spaced therefrom, contact arms carried by the tube and adapted to extend into the tube through the transverse openings provided therethrough, an electric circuit including said contact arms and a switch, said switch operably coupled with said movable member and operable thereby to control said electric circuit, and said element to be heated when inserted in said tube adapted to first engage said contact arms and to extend therebetween and adapted when in position engaged by and extending between said contact arms to then engage and actuate said movable member whereby the switch is operated to close the electric circuit through the contact arms and said element, for heating thereof.

7. An element heating apparatus including a heat resistance tube having one end open and the other end closed and said tube having transverse openings therethrough spaced apart longitudinally of the tube, contact arms carried by said tube and adapted to extend into the tube through the openings provided therein, an element to be heated provided for removable insertion in the tube through the open end thereof for engagement by said contact arms, an electric circuit including said contact arms and a switch for controlling said circuit, and means for closing said switch only when said element is in tube inserted position engaged by the contact arms, including a member slidably disposed in the tube adjacent the closed end thereof and said member operably coupled with said switch, and said member adapted to be engaged by the element to be heated when the element is in tube inserted position engaged by the contact arms to thereby operate the switch to close the circuit through the contact arms and the element to be heated.

CLARENCE E. TURPIN.
RAYMOND JETTER.